United States Patent

[11] 3,603,733

[72] Inventor Robert B. Alterman
Monterey Park, Calif.

[21] Appl. No. 841,941
[22] Filed July 15, 1969
[45] Patented Sept. 7, 1971
[73] Assignee The United States of America as represented by the Secretary of the Air Force

[54] PUSH PULL AMPLIFIER DRIVEN BALANCED TRANSMISSION SYSTEM
3 Claims, 6 Drawing Figs.

[52] U.S. Cl. .......... 178/68, 178/69, 333/12
[51] Int. Cl. .......... H04l 25/08
[50] Field of Search .......... 325/65; 178/68, 88, 69, 69 B, 69 D, 70, 63; 307/219; 333/12, 25, 26, 28; 328/162, 163, 165

[56] References Cited

UNITED STATES PATENTS

| | | | |
|---|---|---|---|
| 3,187,260 | 6/1965 | Dove | 178/68 UX |
| 3,372,350 | 3/1968 | Kawahashi et al. | 325/65 UX |
| 3,381,089 | 4/1968 | Delanoy et al. | 178/70 |
| 3,465,101 | 9/1969 | Christian et al. | 178/68 |

*Primary Examiner*—Robert L. Griffin
*Assistant Examiner*—James A. Brodsky
*Attorneys*—Harry A. Herbert, Jr. and George Fine ABSTRACT: A direct-coupled long-range data transmission system in which each data transmission channel includes a single-ended input data transmitter and single-ended output data receiver interconnected by a balanced pair of transmission line and driven by push-pull amplifiers.

INVENTOR.
ROBERT B. ALTERMAN
BY Harry A. Herbert Jr. and George Fine
ATTORNEYS

INVENTOR.
ROBERT B. ALTERMAN
BY Harry A. Herbert Jr and George Fine
ATTORNEYS

PUSH PULL AMPLIFIER DRIVEN BALANCED TRANSMISSION SYSTEM

BACKGROUND OF THE INVENTION

This invention relates to a data transmission system and more particularly to a direct coupled long range data transmission system.

At certain locations in Satellite Control Facilities, broadband telemetry data (i.e., encompassing NRZ bit rates from 1 to 1 million bits/second) are received and demodulated at one site and processed at another site. The spacing between sites range up to three miles or more across rugged mountains. A jumbled geological structure between the sites indicates that a uniform ground potential could not be obtained.

The problem, then, becomes one of designing an economical means of transmitting the data between the sites without introducing an intolerable degree of pulse generator, spectral distortion, or noise.

The common methods of transmitting this data utilize either unbalanced wires or microwave radio with a tone burst, frequency shift keyed, or multiplexed carrier data modem directly modulated on a radio frequency or microwave carrier, or AC coupling into an unbalanced wire pair.

All of these systems suffer from one or more of the following deficiencies; excessive cost for the number of channels or quantity of data to be transmitted; narrow bandwidth (commercial systems usually are designed for 3 kc. telephone channels); inability to transmit data down to virtually zero cycles/second; need for an elaborate outside plant.

The simplest means of transmitting the data is by direct coupling into a balanced pair of wires. This technique permits very broad bandwidth transmission down to DC, provides a high degree of noise rejection, is immune to large differences in ground potential and does not require elaborate terminals or outside plant.

The difficulty with this technique is that line attenuation is severe over long distances and differential phase delay distorts the pulses. However, terminals equipped with high power transmitters and phase equalizers, coupled with high quality, shielded, balanced pairs, could overcome these difficulties for ranges up to five miles or so.

SUMMARY OF THE INVENTION

A direct coupled long range data transmission system is provided having data transmission channels. Each data transmission channel is comprised of a Data Transmitter and Data Receiver interconnected by a balanced coaxial transmission line. The transmitter is comprised of two line drivers connected with inputs in series and outputs in parallel. The two paralleled outputs drive each side of a balanced transmission line to opposite voltages, thus providing balanced differential outputs from single-ended inputs. As is well known in the art of wideband transmission lines, a balanced coaxial transmission line is a pair of coaxial cables wherein the center conductor of each cable is symmetrical with respect to ground. The differential outputs when applied to each side of the transmission line will obviously result in a total voltage to ground of zero. The data in the form of differential pulses travels over the balanced transmission line and is received by a receiver-input circuit. This circuit, in conjunction with a power amplifier, converts the balanced signals back into unbalanced form for use by attached data-processing equipment.

The present invention described hereinafter offers several advantages over presently known devices. Compared to other balanced, direct coupled systems, such as are encountered in instrumentation system, the present system offers a bandwidth and pulse rise time greatly in excess of the instrumentation system. Some tone burst and other carrier systems provide equivalent performance at the higher frequencies, but do not, as a rule, perform as well at the low end of the frequency spectrum. Many such systems do not work at all at the extremely low frequencies which are required for low bit rate data encoded in nonreturn-to-zero (NRZ) format. The present invention can easily transmit a long string of nonchanging data, which, in NRZ format, requires virtually zero cycles per second transmission capability.

Other carrier and multiplex systems are designed to transmit data in telephone quality channels. Such systems do not provide the bandwidth required for high bit rate data streams. The system of this invention has a usable bandwidth approaching 1 megacycle which is adequate for data rates up to 1 megabit in NRZ format.

The system of this invention has use as an economical wideband data transmitter/receiver for direct transmission of data over ranges extending from a few feet to a few miles. Further uses include transmission of range tracking data from outlying sensors to a central data processing facility; direct hookup of data-processing systems located in different parts of a building; connection of remote data terminals to a central computing facility; connector links or trunk lines in a telephone-switching center which handle video signals or pulse data; and connection of TV monitors to television equipment.

An object of the present invention is to provide a data transmission system.

Another object of the present invention is to provide a direct coupled long range data transmission system.

Yet another object of the present invention is to provide a direct-coupled long-range data transmission system having a single-ended input transmitter and a single-ended output data receiver interconnected by a balanced transmission line.

In the accompanying specification, I shall describe, and in the annexed drawings, show what is at present considered a preferred embodiment of my invention. It is, however, to be clearly understood that I do not wish to be limited to the exact details herein shown and described as they are for purposes of illustration inasmuch as changes therein may be made without the exercise of invention and within the true spirit and scope of the claims hereto appended.

DESCRIPTION OF THE PREFERRED EMBODIMENT

Figure 1:
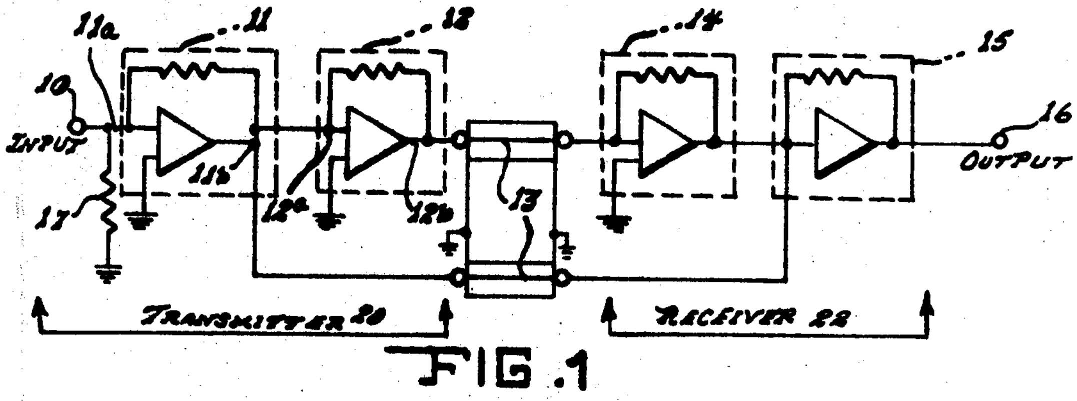
FIG. 1 shows in block diagram form a preferred embodiment of a direct-coupled long-range data transmission system.

Now referring to FIG. 1, there is shown a block diagram of the direct-coupled long-range data transmission system being comprised of transmitter 20, and receiver 22 interconnected by balanced coaxial transmission line 13. Transmitter 20 is comprised of line drivers 11 and 12 connected with inputs 11*a* and 12*a*, respectively, in series and outputs 11*b* and 12*b* in parallel. Line driver 11 feeds line driver 12 if the input data to terminal 10 is characterized by negative pulses; line driver 12 feeds line driver 11 if the input data consists of positive pulses. Line drivers 11 and 12 will be described in detail hereinafter.

The two parallel outputs drive each side of balanced coaxial transmission line 13 to opposite voltages, thus providing balanced differential outputs from single-ended inputs.

The data in the form of differential pulses travels over balanced coaxial transmission line 13 and is received by receiver input amplifier 14 which in conjunction with power amplifier 15 converts the balanced signals back into unbalanced form for use by data-processing equipment.

In the operation of the system, data pulses are received as an unbalanced input at terminal 10 of transmitter 20. Resistor 17 serves to match the impedance of the input transmitter line. Line driver 11 inverts the input data pulses and provides a predetermined voltage output pulse to line driver 12 and to one side of balanced coaxial transmission line 13. Line driver 12 again inverts the predetermined voltage output pulse and provides the same amplitude voltage output pulse to the other side of balanced coaxial transmission line 13. The two outputs are of equal amplitude and opposite polarity and form a balanced data pulse output. This output is applied to receiver 22 via balanced coaxial transmission line 13.

The negative data pulses are received as balanced inputs from the transmission line. The pulses are inverted by receiver input amplifier 14 and applied as an input to power amplifier 15. The positive data pulses are supplied as a second input directly to power amplifier 15 which sums the two voltages and develops an unbalanced output available at output 16.

Figure 5:
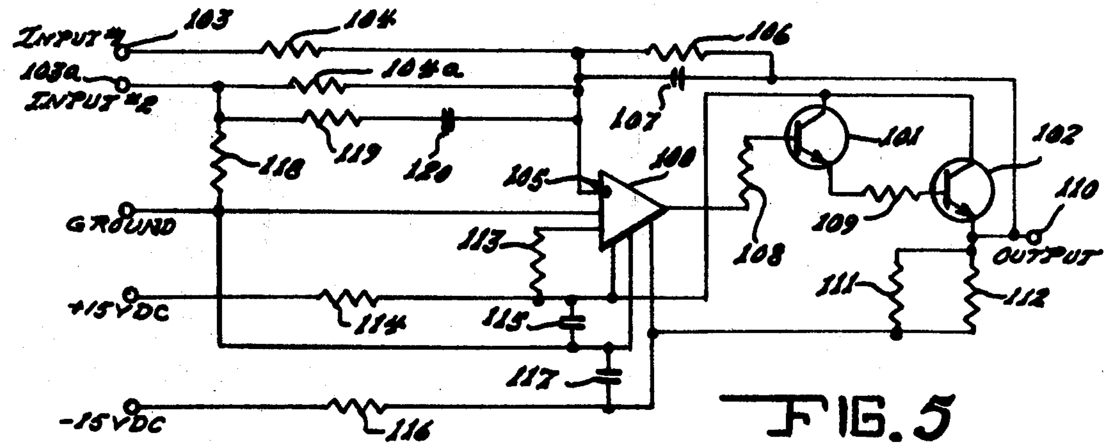
FIG. 5 shows a schematic of power amplifier 15 of FIG. 1 for use if negative output pulses are described.
Figure 6:
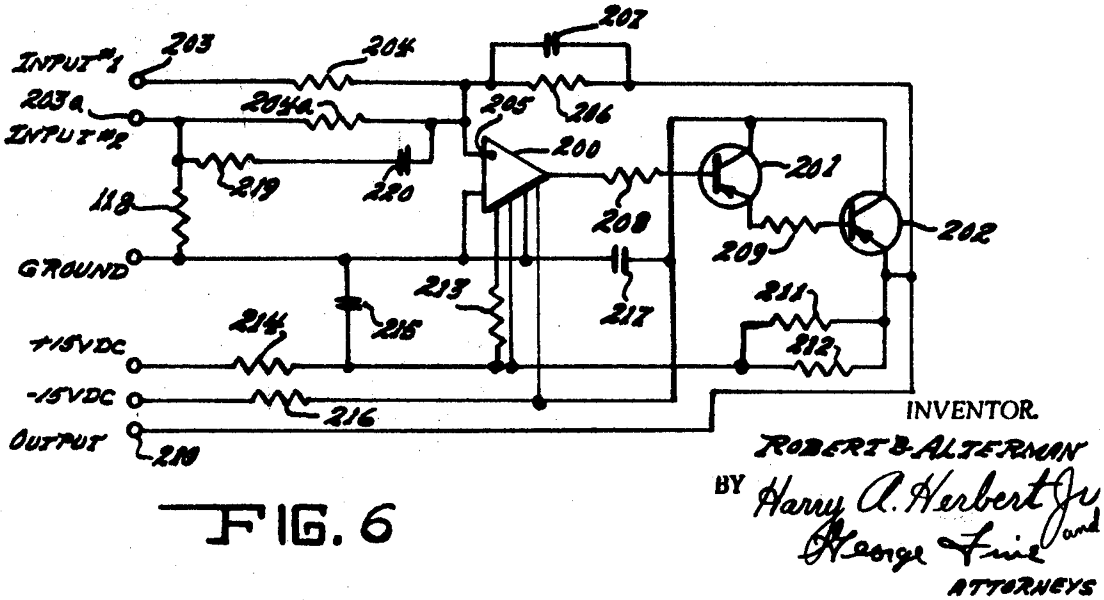
FIG. 6 shows a schematic for power amplifier 15 of FIG. 1 when a positive pulse output is desired.

The system may be configured for either plus or minus input pulses and output pulses independently, as the application requires by interchanging line drivers 11 and 12 and by selecting the proper power amplifier for negative outputs (as the power amplifier of FIG. 5) or positive outputs (as the power amplifier of FIG. 6). If the input pulses are positive line driver 12 precedes line driver 11, and vice versa if the input pulses are negative.

Figure 2:
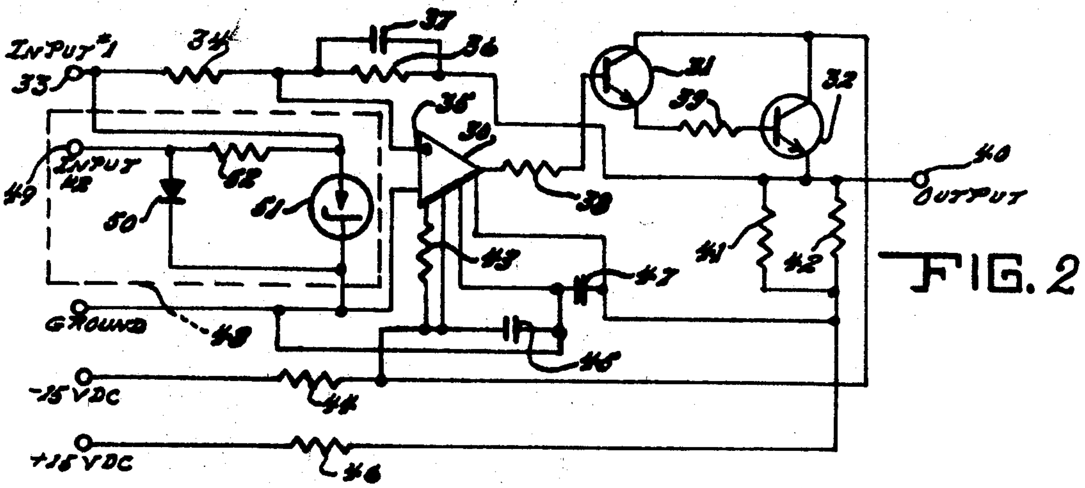
FIG. 2 shows a schematic of the line driver 11 of FIG. 1.

Now referring to FIG. 2 showing line driver 11 of FIG. 1, line driver 11 is comprised of a single-input, single-output amplifier-inverter/emitter-follower circuit. The amplifier-inverter 30 employs an operational amplifier which functions to drive an emitter follower circuit. Operational amplifier is a high-gain, DC voltage amplifier-inverter, and emitter followers 31 and 32 form a modified Darlington circuit to provide a low-impedance output at unity gain. Amplifier-inverter 30 and emitter followers 31 and 32 are connected in an inverse feedback loop to provide the required overall gain.

The low-amplitude input signal is fed to input terminal 33 which is then applied via resistor 34 to pin 35 of amplifier-inverter 30. Pin 35 is the summing point for the input signal and for the feedback via resistor 36. Capacitor 37 suppresses unwanted oscillations in the feedback loop and corrects the phase angle of the feedback signal. The ratio of resistor 36 to resistor 34 sets the overall stage gain to unity. Transistors 31 and 32 are connected inside the feedback loop to correct for offset voltages due to emitter base drops.

The inverted output signal of amplifier-inverter 30 is fed via bias-stabilizing resistor 38 to the input of transistor 31. The output of transistor 31 is applied via bias stabilizing resistor 39 to the input of transistor 32. Output transistor 32 provides a signal to the feedback loop and to output terminal 40. Resistors 41 and 42 set the quiescent DC current level of transistor 32. Resistor 43 is an error voltage correction resistor which provides zero volts output for zero volts input. The combination of resistor 44 and capacitor 45 and resistor 46 and capacitor 47 provide decoupling for the +15 and −15 volt power leads.

An alternate input circuit 48 is furnished for high level inputs. This input is functionally identical to that discussed above with two exceptions (1) a high-amplitude input is applied through input terminal 49, instead of low-amplitude input through terminal 33; and (2) a limiting circuit, comprising diode 50, voltage regulator 51, and resistor 52, is added between input 49 and resistor 34. Diode 50 functions to clip any positive peaks on the input signal, and resistor 52 acts as a current-limiting device for voltage regulator 51. Voltage regulator 51 is a Zener diode which regulates the input signal to a predetermined magnitude (for example 6.8 v.) for application to pin 35 of amplifier-inverter 30 via resistor 34.

Figure 3:
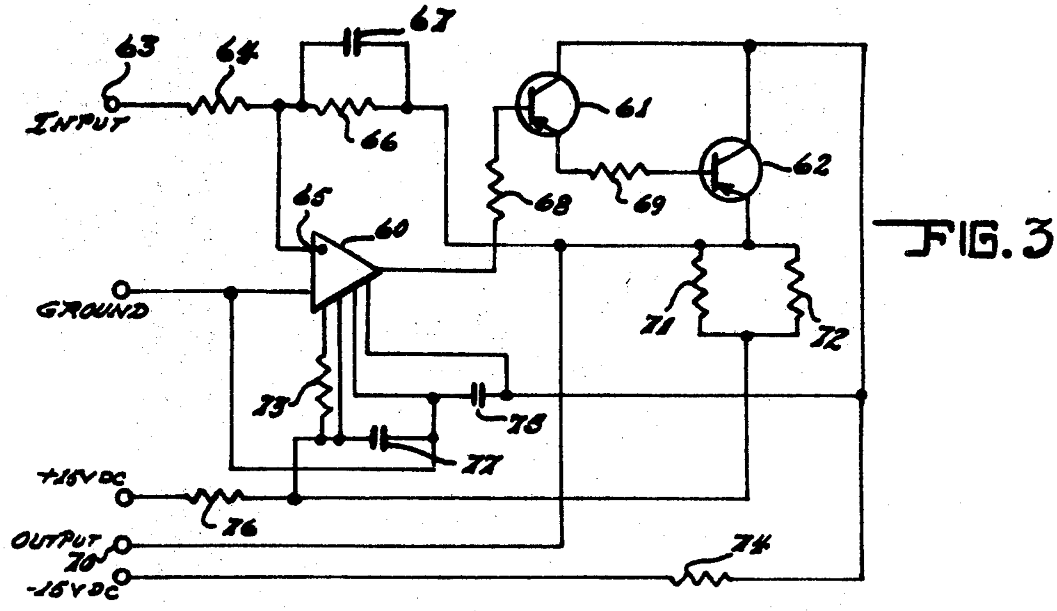
FIG. 3 shows a schematic of line driver 12 of FIG. 1.

Now referring to FIG. 3 showing line driver 12 of FIG. 1, line driver 12 is comprised of a single-input, single-output amplifier inverter/emitter follower circuit. Amplifier-inverter 60 employs an operational amplifier which drives an emitter follower circuit of transistors 61 and 62. The operational amplifier is a high-gain, DC voltage amplifier-inverter, and emitter followers transistors 61 and 62 form a modified Darlington circuit to provide a low impedance output at unity gain. Amplifier-inverter 60, and transistors 61 and 62 are connected in an inverse feedback loop to provide the required overall gain.

The input signal is received by way of input terminal 63 and fed by way of resistor 64 to pin 65 of amplifier-inverter 60. Pin 65 is the summing point for the input signal and for feedback resistor 66. Capacitor 67 suppresses unwanted oscillations in the feedback loop. The ratio of resistors 66 to 64 sets the overall stage gain to unity. Transistors 61 and 62 are connected in the feedback loop to correct for offset voltage due to emitter base drops. Because a negative-going output signal is required, PNP transistors are used.

The inverted output signal of amplifier-inverter 60 is fed via bias-stabilizing resistor 68 to the base of transistor 61. The output of transistor 61 is applied via bias-stabilizing resistor 69 to the input of transistor 62. Output transistor 62 provides a signal to the feedback loop and to output terminal 70. Resistors 71 and 72 set the quiescent DC current level of transistor 62. Capacitor 67 corrects the phase angle of the feedback signal and tends to suppress unwanted oscillations. Resistor 73 is an error correction resistor which provides zero volts output for zero volts input. The combination of resistor 74 and capacitor 75, resistor 76 and capacitor 77 provide decoupling for the +15 and −15 volt power leads.

Figure 4:
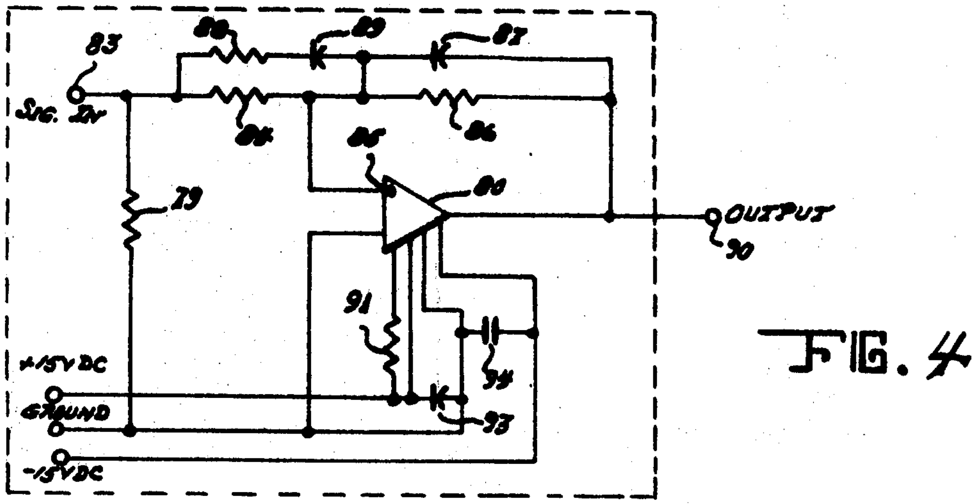
FIG. 4 shows a schematic of receiver input amplifier 14.

Now referring to FIG. 4 showing a schematic of receiver input amplifier 14 of FIG. 1, there is utilized two single-stage amplifier-inverter circuits. Each of the amplifier-inverter circuits uses an operational amplifier with a negative feedback loop. An input signal received at terminal 83 is applied via resistor 84 to input 85 of amplifier-inverter 80. Resistor 79 is used to terminate one side of the balanced transmission line 13 of FIG. 1. The input signal and the feedback via resistor 86 from the amplifier output are summed at terminal 85 of the amplifier-inverter 80. The ratio of resistor 86 to resistor 84 determines the closed loop gain of the amplifier at output terminal 90. Capacitor 87 suppresses unwanted oscillations in the feedback loop. Resistor 88 and capacitor 89 form a high-frequency compensation network. Resistor 91 is an error voltage correction resistor which gives zero volts for zero volts input. Capacitors 92 and 93 decouple the +15 and −15 volts DC power leads.

Now referring in detail to FIG. 5 which is a schematic of amplifier 15 of FIG. 1, it is comprised of a dual-input single-output amplifier-inverter/emitter follower circuit. Amplifier-inverter 100 employs an operational amplifier which drives an emitter-follower circuit. Amplifier 100 is a high-gain, DC voltage amplifier-inverter, and emitter followers 101 and 102 form a modified Darlington circuit to provide a low impedance output at unity gain. Amplifier-inverter 100, emitter-followers 101 and 102 are connected in an inverse feedback loop to provide the required overall gain.

Input signal from the output of receiver input amplifier 14 of FIG. 1 is received by terminal 103 and then applied via resistor 104 to pin 105 of amplifier-inverter 100. A second input signal from one side of transmission line 13 of FIG. 2 is received at terminal **103*a* and is applied to pin 105 by way of resistor 104*a*. Pin 105 is the summing point for the two input signals and the feedback from the output of transistor 102 through resistor 106. Capacitor 107 suppresses unwanted oscillation in the feedback loop. Polarities of the input signals are such that the signals add, and any common mode voltage received is cancelled. The ratio of resistor 106 to 104*a* determines the gain of the input signal at terminal 103*a*. Similarly, the ratio of resistor 106 to resistor 104 determines the gain of the input signal at terminal 103. Transistors 101 and 102** are connected inside the feedback loop to correct the offset voltages due to emitter base drops.

The inverted output signal of amplifier-inverter 100 is fed through bias-stabilizing resistor 108 to the base of transistor 101. The output of transistor 101 is applied via bias-stabilizing resistor 109 to the base of transistor 102. Output transistor 102 provides a signal to the feedback loop and to output terminal 110. Resistors 111 and 112 set the quiescent DC current level of transistor 102. Resistor 119 and capacitor 120 form a high frequency compensation network. Resistor 113 is an error voltage correction resistor which provides zero volts output for zero volts input. Resistors 114 and capacitors 115, resistor 116 and capacitor 117 comprise a filter decoupling network for the +15 and −15 volt power leads respectively. Resistor 118 is used to terminate one side of the 124-ohm balanced transmission line 13 of FIG. 1.

It is noted and emphasized that the power amplifier of FIG. 5 is utilized when negative outputs are required. When positive outputs are required, the amplifier shown in FIG. 6 is utilized.

Now referring in detail to FIG. 6 which is a schematic of power amplifier 15 to be utilized in FIG. 1 for providing a positive output therefrom, it is comprised of a dual-input, single output amplifier-inverter/emitter follower circuit. The amplifier inverter employs an operational amplifier which drives the emitter-follower circuit. Amplifier-inverter 200 is a high-gain, DC voltage amplifier-inverter, and emitter followers 201 and 202 form a modified Darlington circuit to provide a low impedance output at unity gain. Amplifier-inverter 200, emitter-followers 201 and 202 are connected in an inverse feedback loop to provide the required overall gain.

A first input signal from the output of receiver input amplifier 14 of FIG. 1 is received by terminal 203 and applied via resistor 204 to pin 205 of amplifier-inverter 200. A second input signal from the output of balanced coaxial transmission line 13 of FIG. 1 is received at terminal 203*a* and applied via resistor 204*a* to pin 205 of amplifier-inverter 200. Pin 205 is the summing point for the two input signals and the feedback from the output of emitter-follower 202 via resistor 206. Capacitor 207 suppresses unwanted oscillations in the feedback loop. Resistor 118 functions as a terminating resistor when one-half of the balanced coaxial transmission line 13 of FIG. 1 is connected to input terminal 203*a*. Resistor 219 and capacitor 220 form a high-frequency compensation network to boost the frequency response. Polarities of the input signals are such that the signals add, and any common mode voltage received from the input line is cancelled. The ratio of resistor 206 to resistor 204*a* determines the gain of the input signal received at terminal 203*a*. Similarly, the ratio of resistor 206 to resistor 204 determines the gain of the input signal received at terminal 203. Emitter-followers 201 and 202 are connected inside the feedback loop to correct for offset voltages due to emitter-to-base drops.

The inverted output signal of amplifier-inverter 200 is fed via bias-stabilizing resistor 209 to the base of emitter-follower 201. The output of emitter-follower 201 is fed via bias-stabilizing resistor 209 to output-terminal 210. Resistors 211 and 212 set the quiescent DC current level of emitter-follower 202. Capacitor 207 corrects the phase angle of the feedback signal and tends to suppress unwanted oscillations. Resistor 219 and capacitor 220 from a high-frequency compensation network. Resistor 213 is an error voltage correction resistor which provides zero volts output for zero volts input. Resistor 214 and capacitor 215, and resistor 216 and capacitor 217, comprise filter decoupling networks for the +15 and −15 volt power leads, respectively.

The following features are provided by the present invention. The system possesses very broad bandwidth, or conversely, can handle high-speed data pulses, by using high power, fast switching transistors directly coupled throughout. The transmitters and receivers are directly coupled to the transmission line so pulse spectra down to DC can be transmitted. The transmitted outputs and receiver inputs are balanced with respect to ground to eliminate noise and ground potential problems. Single-ended operational amplifiers are connected in a differential circuit so as to achieve excellent common-mode noise rejection. The design is modularized and arranged that the data terminals, in addition to pulse transmission and reception, can perform pulse inversion, and can accept pulses of various voltages, polarities, and logic levels. The data terminals contain equalization circuits to compensate for differing line lengths and transmission characteristics. Finally, transmitter output impedance need not be matched to the line.

What I claim is:

1. A direct coupled long range data transmission system comprising a first line driver having one input and one output, a second line driver also having one input and one output, with said input of said first line driver receiving the data to be transmitted, with the output of said first line driver being connected to the said input of said second line driver, said first and second line drivers consisting of amplifier-inverters, a balanced transmission line having first and second input and output terminals, said first input terminal being connected to said output of said second line driver and said second input terminal being connected to said output of said first line driver, a receiver amplifier having input and output and located at a distance remote from said first and second line driver, said receiver operating to invert the input thereto, said input of said receiver amplifier being connected to said first output terminal of said balanced transmission line, and a power amplifier having an input and output, said input of said power amplifier being simultaneously connected to said second output terminal of said balanced transmission line and aid output of said receiver amplifier with said output of said power amplifier providing the transmitted data at a remote location.

2. A direct-coupled long-range data transmission system as described in claim 1 wherein said first and second line drivers comprise a transmitter, and said receiver amplifier and said power amplifier comprise a receiver, said transmitter and said receiver being interconnected by a balanced coaxial transmission line.

3. A direct-coupled long-range data transmission system as described in claim 1 wherein said receiver amplifier includes an equalizing network to compensate for transmission line characteristics.